UNITED STATES PATENT OFFICE.

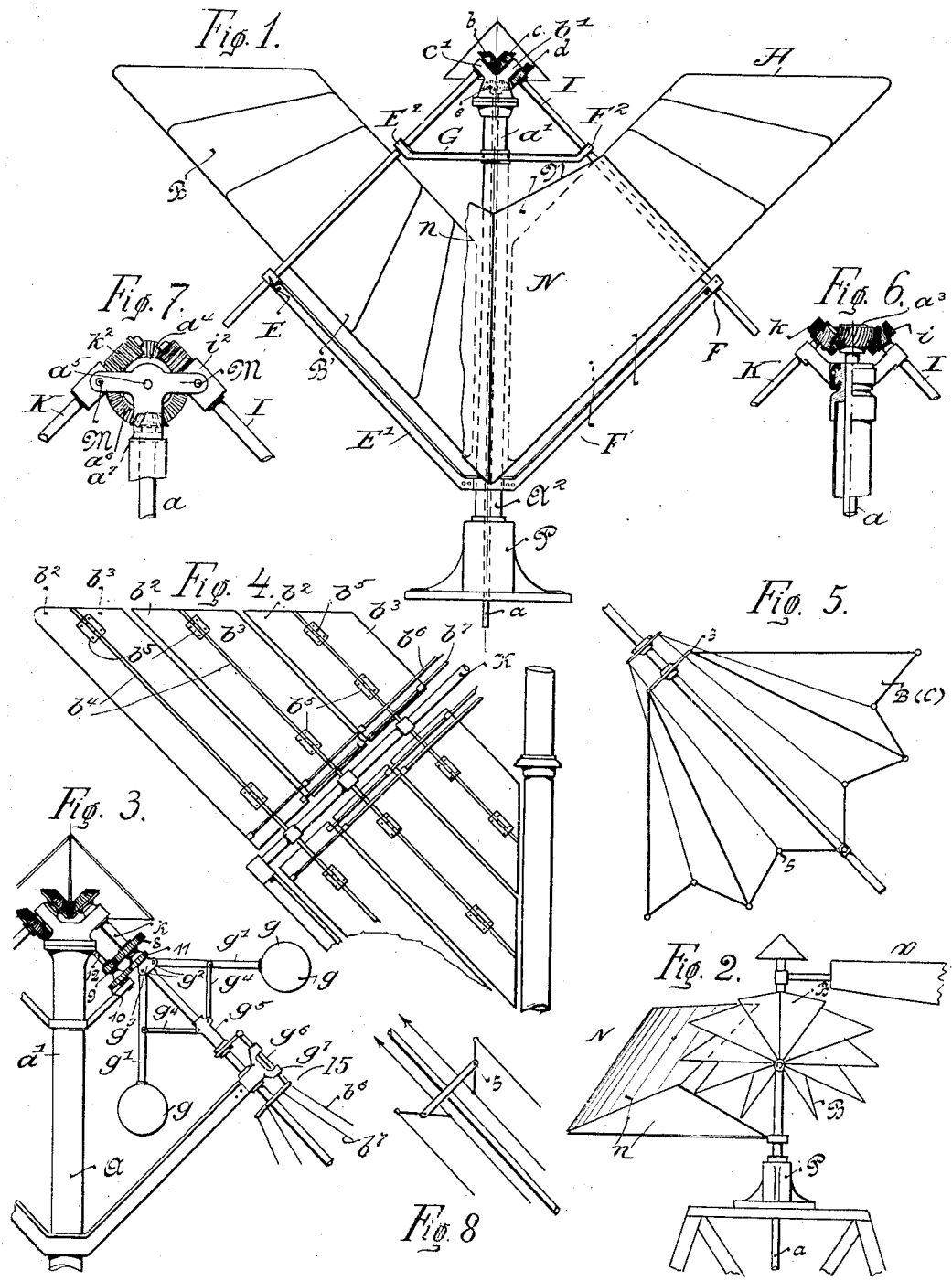

JOSEF HOMOLA, OF VESELI, AUSTRIA-HUNGARY.

MACHINE FOR USE WITH WIND-POWER.

No. 869,709.　　　　　Specification of Letters Patent.　　　Patented Oct. 29, 1907.

Application filed September 28, 1906. Serial No. 336,577.

*To all whom it may concern:*

Be it known that I, JOSEF HOMOLA, a subject of the Emperor of Austria, residing at Veseli, Moravia, Austria, have invented certain new and useful Improvements in Machines for Use of the Wind-Power, the following being a full description of this invention.

This invention relates to machines adapted to be acted upon by the wind, as in the case of windmills, and also serviceable to act upon the wind as in the case of a propeller for an airship or the like.

The invention consists in the provision of co-acting sail-wheels adapted to be operatively related to act as a unitary driving mechanism upon a driven member or to be jointly acted upon as a driven member by a prime mover and in the further provision of a wind deflector whereby the air-currents are directed upon the sail-wheels in a manner to utilize said currents advantageously.

The invention also consists in the provision of an improved form of sail adapted to be reefed in order to control the speed of the apparatus together with means for automatically reefing said sails.

The invention will be more fully described in connection with the accompanying drawing and will be more particularly pointed out in and by the appended claims.

In the drawings:—Figure 1 is a side elevation of a device embodying the main features of my invention, showing the same adapted to act as a windmill. Fig. 2 is a side elevation thereof. Fig. 3 illustrates an improved form of governor for reefing the sails of the sail-wheels. Fig. 4 illustrates an improved form of reefable sail-wheel. Fig. 5 illustrates a modified form of sail-wheel. Fig. 6 illustrates a modification of the means for operatively connecting the shafts of the sail-wheels. Fig. 7 illustrates a further modification of this feature of the invention. Fig. 8 illustrates the arrangement of levers for adjusting or reefing the sails.

Like characters of reference designate similar parts throughout the different figures of the drawing.

The device, as shown, in Figs. 1 and 2, is adapted to act as a wind-mill although it will be understood that my invention is not limited to this particular use. $a$ designates a vertically disposed transmission shaft having bearings in a pedestal $p$ fixed to any stationary part, such as the structure of a wind-mill, and extending upwardly into and through a revolubly mounted sail-wheel supporting frame. Said frame consists of a sleeve $a'$ forming the upper bearing of the transmission shaft $a$, said frame resting and rotating upon a support $a^2$ mounted on the pedestal $p$. Bearings E and F are formed in brackets E$'$ and F$'$ extending upwardly from support $a^2$ and bearings E$^2$ and F$^2$ are formed in a bracket G mounted upon the sleeve $a'$. The device as shown includes two sail-wheels A and B which are preferably disposed in a manner to bring their axes in angular relation with respect to each other and, in the present construction, the said wheels are so disposed that their axes are at right angles to each other, both being inclined with respect to the vertical in a manner to cause said axes to intersect the axis of the transmission shaft $a$ at the same point. In this disposition of the sail-wheels the latter are conical and the radial length of the sails is proportioned in a manner to permit them to freely pass the sleeve $a'$ when in position. Said wheels A and B are mounted upon shafts K and I journaled respectively in bearings E$^2$, E, F$^2$, F. On their upper or converging ends said shafts carry miters $c$ and $b$ by means of which the sail-wheels are operatively connected. Bearings $c'$ and $b'$ are formed in the upper end of the sleeve A$'$ for the upper or converging ends of the shafts I and K, said bearings serving to hold the miters $c$ and $b$ in mesh.

The sail-wheels A and B are operatively connected with the transmission shaft $a$ as shown by the provision of a miter $d$ upon the shaft I, meshing with the miter $e$ upon the upper end of the transmission shaft $a$. From the foregoing it will be seen that the sail-wheels A and B are not only operatively related with each other but that both are operatively related to the transmission shaft and it will be further obvious that the transmission shaft $a$ may either constitute the driving or the driven member. It will be obvious by reference to Fig. 1 that if the sail-wheels were exposed to the air-currents throughout their engaging areas they would be acted upon with equal pressure on opposite sides of their shafts K and I, thereby causing said wheels to remain in a position of rest or, in other words, in an equilibrium of pressure. In order to destroy this equilibrium of pressure and cause the wheels to act in unison and rotate in opposite directions to the air-currents flowing toward the adjoining sails of the wheels which in the present construction is in the plane of the shaft $a$, there is provided means whereby the centrally traveling currents are deflected in a manner to cause them to engage the wheels at points laterally and outwardly from their axes of rotation or at points beyond shafts I and K. As shown said means consists of a deflector N provided with wings $n$ extending laterally to points beyond the axes of the wheels A and B, as clearly shown in Figs. 1 and 2. The usual vane $x$ is provided to maintain the sail-wheels in the path of the wind.

In order to regulate the speed of the sail-wheels and to prevent the same from being subjected to the action of violent winds, I desirably provide sail-wheels constructed as shown in Fig. 4, wherein the sails are formed of movably mounted sail members capable of being automatically or manually reefed. As shown in said figure each wing or sail as a whole is composed of a plurality of radially disposed and hingedly mounted sail members $b^2$ and $b^3$ supported on sail shafts $b^4$ rigidly secured to shaft K. Hinges $b^5$ serve to unite the sail members $b^2$ and $b^3$ to said sail rods. Reef rods $b^6$ and $b^7$ are connected with the wing members $b^2$ and $b^3$, respectively, and are adapted to be operated either manually or by automatic means to either partially or completely reef said sail members.

In Fig. 3 there is shown a device for automatically reefing the sails which consists of a governor mounted on shaft K provided with balls $g$ carried by arms $g'$. Said arms $g'$ are pivotally mounted at $g^2$ upon a sleeve $g^3$ loosely mounted upon the shaft K carrying a gear pinion 11. A countershaft 12, mounted in suitable bearings upon the sleeve $a'$, carries pinions 9 and 10, the latter meshing with pinion 11 and the former meshing with pinion 8 which is non-rotatably mounted on the shaft K. It will be obvious that this train of gears rotates the governor at a materially increased speed with respect to the speed of the shaft K and it will further be obvious that the speed of the governor may be varied by the substitution of gear pinions of different sizes.

To the arms $g'$ there is pivotally mounted links $g^4$ connected with an operating sleeve $g^5$ slidably mounted on the shaft K. Said sleeve $g^5$ is connected by means of a rod $g^6$ mounted in bearings $g^7$ with an adjusting member 15 with which the rods $b^6$ and $b^7$ are connected. It will be obvious from the foregoing that the sail-wheels may be accurately controlled to operate at any predetermined speed.

In Fig. 6 is shown a different manner of operatively connecting the wheels A and B to the transmission shaft $a$. As shown the shaft K carries a worm-wheel $k$ and the shaft I a similar worm wheel $i$, both adapted to mesh with a worm wheel $a^3$ mounted on transmission shaft $a$. In Fig. 7 is shown a further means of operatively connecting the sail-wheel shafts with the transmission shaft. In this form the shafts K and I carry worms $k^2$ and $i^2$, meshing with a worm wheel $a^4$ mounted upon a shaft $a^5$. Said shaft $a^5$ carries a bevel gear $a^6$ meshing with a gear $a^7$ mounted on the transmission shaft $a$. As shown a bracket M is provided which pivotally supports the shafts K and I at $m$.

I claim:—

1. In combination, angularly disposed sail-wheels located in a manner to bring the adjacent margins of the sails in relatively close proximity, and means extending from the adjacent margins laterally to points beyond the axes of said sail wheels for deflecting wind or air currents toward the outermost sails.

2. In combination, angularly disposed sail-wheels located in a manner to bring the adjacent margins of the sails in relatively close proximity, and a deflector provided with wings extending laterally to the axes of said wheels for deflecting wind or air currents toward the outermost sails.

3. In combination, angularly disposed sail-wheels operatively connected with each other to operate in unison and located in a manner to bring the margins of certain of the sails in relatively close proximity, a transmission shaft operatively connected with said wheels, and means projecting laterally from the adjacent margins of said sails beyond the axes of said wheels for deflecting wind or air currents toward the outermost sails.

4. In combination, angularly disposed conical sail-wheels connected to operate in unison and located in a manner to bring the adjacent margins of said sails in relatively close proximity, a shaft operatively related to said wheels, and means for deflecting air currents laterally to the outermost sails of said wheels.

5. In combination, angularly disposed sail-wheels connected to operate in unison and located in a manner to bring certain of the sails in relatively close proximity, means for automatically reefing said sails, and means for deflecting air currents to the outermost sails of said wheels.

6. In combination, angularly disposed conical sail-wheels connected to operate in unison and located in a manner to bring adjacent sails in relatively close proximity, means for deflecting air currents to the outermost sails of said wheels, said wheels having sails composed of movable members adapted to be reefed, and means for reefing said sail members.

7. In combination, angularly disposed sail-wheels located in a manner, to bring adjacent sails in relatively close proximity, means for deflecting air currents to the outermost sails of said wheels, said wheels having sails composed of movable members adapted to be reefed, and an automatically acting device for reefing said sail members.

8. In combination, angularly disposed conical sail-wheels provided with movable members adapted to be reefed and located in a manner to bring adjacent sails in relatively close proximity, said sail-wheels being connected with each other to operate in unison, a shaft operatively connected with said wheels, a deflector provided with wings adapted to deflect air currents to points outwardly beyond the axes of said sail-wheels, and a governor for automatically reefing said sail members.

9. In combination, sail wheels located in a manner to bring adjacent margins of the sails in relatively close proximity, and means extending from the adjacent margins to points beyond the axes of said sail-wheels for deflecting wind or air currents toward the outermost sails.

In testimony whereof I affix my signature in presence of two witnesses.

JOSEF HOMOLA.

Witnesses:
ALVESTO S. HOGUE,
YGNAZ KNÖRFELMACHER.